United States Patent
Bian et al.

(10) Patent No.: US 11,340,426 B2
(45) Date of Patent: May 24, 2022

(54) CAMERA OPTICAL LENS

(71) Applicant: AAC Optics Solutions Pte. Ltd., Singapore (SG)

(72) Inventors: Xuqi Bian, Shenzhen (CN); Wen Sun, Shenzhen (CN)

(73) Assignee: AAC Optics Solutions Pte. Ltd., Singapore (SG)

(*) Notice: Subject to any disclaimer, the term of this patent is extended or adjusted under 35 U.S.C. 154(b) by 409 days.

(21) Appl. No.: 16/706,729

(22) Filed: Dec. 7, 2019

(65) Prior Publication Data
US 2020/0209548 A1    Jul. 2, 2020

(30) Foreign Application Priority Data
Dec. 28, 2018   (CN) .......................... 201811626417.3

(51) Int. Cl.
*G02B 9/64*      (2006.01)
*G02B 13/00*    (2006.01)
*G02B 27/00*    (2006.01)

(52) U.S. Cl.
CPC ........... *G02B 9/64* (2013.01); *G02B 13/0045* (2013.01); *G02B 27/0012* (2013.01)

(58) Field of Classification Search
CPC .. G02B 9/64; G02B 13/0045; G02B 27/0012; G02B 13/18; G02B 13/005
USPC ........................................... 359/755
See application file for complete search history.

(56) References Cited

U.S. PATENT DOCUMENTS

| | | | |
|---|---|---|---|
| 10,732,388 B2* | 8/2020 | Hashimoto | G02B 13/0045 |
| 2016/0124191 A1* | 5/2016 | Hashimoto | G02B 9/64 359/708 |
| 2019/0025549 A1* | 1/2019 | Hsueh | G02B 9/64 |
| 2019/0056569 A1* | 2/2019 | Yoo | G02B 13/0045 |
| 2020/0132969 A1* | 4/2020 | Huang | G02B 9/64 |

* cited by examiner

*Primary Examiner* — Darryl J Collins
*Assistant Examiner* — Matthew Y Lee
(74) *Attorney, Agent, or Firm* — W&G Law Group (57) ABSTRACT

The present disclosure relates to the field of optical lenses and provides a camera optical lens. The camera optical lens includes, from an object side to an image side: an aperture; a first lens having a positive refractive power; a second lens having a negative refractive power; a third lens having a positive refractive power; a fourth lens having a negative refractive power; a fifth lens having a positive refractive power; a sixth lens having a negative refractive power; and a seventh lens having a negative refractive power. The camera optical lens satisfies following conditions: $5.00 \leq f4/f2 \leq 10.00$; and $7.50 \leq f3/f5 \leq 50.00$, where f2 denotes a focal length of the second lens; f3 denotes a focal length of the third lens; f4 denotes a focal length of the fourth lens; and f5 denotes a focal length of the fifth lens.

5 Claims, 9 Drawing Sheets

CAMERA OPTICAL LENS

TECHNICAL FIELD

The present disclosure relates to the field of optical lens, and more particularly, to a camera optical lens suitable for handheld terminal devices such as smart phones or digital cameras and camera devices such as monitors or PC lenses.

BACKGROUND

With the emergence of smart phones in recent years, the demand for miniature camera lens is increasing day by day, but in general the photosensitive devices of camera lens are nothing more than Charge Coupled Device (CCD) or Complementary Metal-Oxide Semiconductor Sensor (CMOS sensor), and as the progress of the semiconductor manufacturing technology makes the pixel size of the photosensitive devices become smaller, plus the current development trend of electronic products towards better functions and thinner and smaller dimensions, miniature camera lenses with good imaging quality therefore have become a mainstream in the market.

In order to obtain better imaging quality, the lens that is traditionally equipped in mobile phone cameras adopts a three-piece or four-piece lens structure, or even a five-piece or six-piece structure. Also, with the development of technology and the increase of the diverse demands of users, and as the pixel area of photosensitive devices is becoming smaller and smaller and the requirement of the system on the imaging quality is improving constantly, a seven-piece lens structure gradually appears in lens designs. Although the common seven-piece lens has good optical performance, its settings on refractive power, lens spacing and lens shape still have some irrationality, which results in that the lens structure cannot achieve a high optical performance while satisfying design requirements for ultra-thin lenses having a big aperture.

BRIEF DESCRIPTION OF DRAWINGS

Many aspects of the exemplary embodiment can be better understood with reference to the following drawings. The components in the drawings are not necessarily drawn to scale, the emphasis instead being placed upon clearly illustrating the principles of the present disclosure. Moreover, in the drawings, like reference numerals designate corresponding parts throughout the several views.

DESCRIPTION OF EMBODIMENTS

The present disclosure will hereinafter be described in detail with reference to several exemplary embodiments. To make the technical problems to be solved, technical solutions and beneficial effects of the present disclosure more apparent, the present disclosure is described in further detail together with the figure and the embodiments. It should be understood the specific embodiments described hereby is only to explain the disclosure, not intended to limit the disclosure.

Embodiment 1

Figure 1:
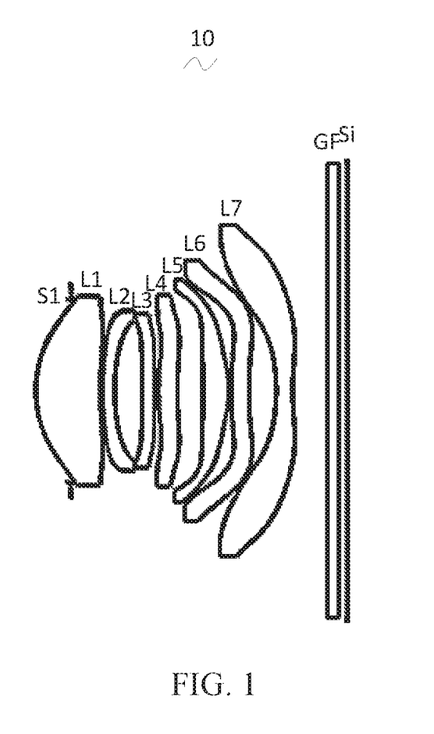
FIG. 1 is a schematic diagram of a structure of a camera optical lens in accordance with Embodiment 1 of the present disclosure.

Referring to FIG. 1, the present disclosure provides a camera optical lens 10. FIG. 1 shows the camera optical lens 10 according to Embodiment 1 of the present disclosure. The camera optical lens 10 includes 7 lenses. Specifically, the camera optical lens 10 includes, from an object side to an image side, an aperture S1, a first lens L1, a second lens L2, a third lens L3, a fourth lens L4, a fifth lens L5, a sixth lens L6 and a seventh lens L7. An optical element such as a glass plate GF can be arranged between the seventh lens L7 and an image plane Si. The glass plate GF can be a glass cover plate or an optical filter. In other embodiments, the glass plate GF can be arranged at other positions.

In present embodiment, the first lens L1 has a positive refractive power, and has an object side surface being a convex surface and an image object surface being a concave surface; the second lens L2 has a negative refractive power, and has an object side surface being a convex surface and an image object surface being a concave surface; the third lens L3 has a positive refractive power, and has an object side surface being a concave surface and an image object surface being a convex surface; the fourth lens L4 has a negative refractive power, and has an object side surface being a convex surface and an image object surface being a concave surface; the fifth lens L5 has a positive refractive power, and has an object side surface being a concave surface and an image object surface being a convex surface; a sixth lens L6 has a negative refractive power, and has an object side surface being a concave surface and an image object surface being a concave surface; and a seventh lens L7 has a negative refractive power, and has an object side surface being a concave surface and an image object surface being a concave surface.

Here, a focal length of the second lens is defined as f2, a focal length of the third lens is defined as f3, a focal length of the fourth lens is defined as f4, and a focal length of the fifth lens is defined as f5. The camera optical lens 10 should satisfy following conditions:

$$5.00 \leq f4/f2 \leq 10.00 \quad (1); \text{ and}$$

$$7.50 \leq f3/f5 \leq 50.00 \quad (2).$$

The condition (1) specifies a ratio of the focal length of the fourth lens L4 and the focal length of the second lens L2. This leads to the more appropriate distribution of the refractive power, thereby facilitating development towards ultra-thin lenses having a big aperture while achieving a better imaging quality and a lower sensitivity.

The condition (2) specifies a ratio of the focal length of the third lens L3 and the focal length of the fifth lens L5. This can effectively make a light angle of the camera lens gentle and reduce the tolerance sensitivity.

In this embodiment, with the above configurations of the lenses, the camera optical lens can achieve a high optical performance while satisfying design requirements for ultra-thin lenses having a big aperture.

In an example, a focal length of the camera optical lens is defined as f. The camera optical lens 10 should satisfy a following condition:

$$-5.00 \leq f2/f \leq -3.00 \quad (3).$$

The condition (3) specifies a ratio of the focal length of the second lens L2 and the focal length of the camera optical lens 10. When the condition is satisfied, a spherical aberration caused by the first lens and the field curvature of the system can be effectively balanced.

In an example, an on-axis thickness of the second lens is defined as d3, an on-axis thickness of the third lens is defined as d5, and a total optical length from the object side surface of the first lens to an image plane of the camera optical lens along an optic axis is defined as TTL. The camera optical lens 10 should satisfy a following condition:

$$0 \leq (d3+d5)/TTL \leq 0.10 \quad (4).$$

The condition (4) specifies a ratio of a sum of the on-axis thicknesses of the second lens L2 and the third lens L3 to TTL. This can facilitate improving the image quality while achieving ultra-thin lenses.

In an example, a curvature radius of the object side surface of the third lens is defined as R5, and a curvature radius of the image side surface of the third lens is defined as R6. The camera optical lens 10 should satisfy a following condition:

$$4.00 \leq (R5+R6)/(R5-R6) \leq 11.00 \quad (5).$$

The condition (5) specifies a shape of the third lens R3. This can facilitate shaping of the third lens L3 and avoiding bad shaping and generation of stress due to the overly large surface curvature of the third lens L3.

In an example, a curvature radius of the object side surface of the fourth lens is defined as R7, and a curvature radius of the image side surface of the fourth lens is defined as R8. The camera optical lens 10 should satisfy a following condition:

$$5.00 \leq (R7+R8)/(R7-R8) \leq 20.00 \quad (6).$$

The condition (6) specifies a shape of the fourth lens R4. This can facilitate correction of an off-axis aberration.

In this embodiment, the first lens L1 is made of a glass material, and thus the first lens L1 has a good performance in terms of temperature and humidity reliability and has a large Abbe number, thereby effectively correcting a chromatic aberration while improving the optical performance of the camera optical lens. In this embodiment, each of the second lens L2, the third lens L3, the fourth lens L4, the fifth lens L5, the sixth lens L6 and the seventh lens L7 is made of a plastic material. This can effectively reduce production costs.

In addition, a surface of a lens can be set as an aspherical surface. The aspherical surface can be easily formed into a shape other than the spherical surface, so that more control variables can be obtained to reduce the aberration, thereby reducing the number of lenses and thus effectively reducing a total length of the camera optical lens according to the present disclosure. In an embodiment of the present disclosure, both an object side surface and an image side surface of each lens are aspherical surfaces.

It should be noted that the first lens L1, the second lens L2, the third lens L3, the fourth lens L4, the fifth lens L5, the sixth lens L6 and the seventh lens L7 that constitute the camera optical lens 10 of the present embodiment have the structure and parameter relationships as described above, and therefore, the camera optical lens 10 can reasonably distribute the refractive power, the surface shape, materials, the on-axis thickness and the like of each lens, and thus correct various aberrations. The camera optical lens 10 has Fno≤1.45. TTL and an image height (IH) of the camera optical lens 10 satisfy a condition of TTL/IH≤1.48. The field of view (FOV) of the camera optical lens 10 satisfies FOV≥76 degrees. This can achieve a high imaging performance while satisfying design requirements for ultra-thin lenses having a big aperture.

In an example, inflexion points and/or arrest points can be arranged on the object side surface and/or image side surface of the lens, so as to satisfy the demand for the high quality imaging. The description below can be referred to for specific implementations.

The design information of the camera optical lens 10 in Embodiment 1 of the present disclosure is shown in the following. It should be noted that each of the distance, radii and the thickness is in a unit of millimeter (mm).

Table 1 and Table 2 show design data of the camera optical lens 10 according to Embodiment 1 of the present disclosure.

TABLE 1

|  | R |  | d | nd |  | vd |
|---|---|---|---|---|---|---|
| S1 | ∞ | d0 = | −0.634 |  |  |  |
| R1 | 1.987 | d1 = | 1.158 | nd1 | 1.5378 v1 | 74.70 |
| R2 | 10.351 | d2 = | 0.041 |  |  |  |
| R3 | 9.233 | d3 = | 0.222 | nd2 | 1.6610 v2 | 20.53 |
| R4 | 4.849 | d4 = | 0.489 |  |  |  |
| R5 | −18.701 | d5 = | 0.221 | nd3 | 1.6610 v3 | 20.53 |
| R6 | −15.332 | d6 = | 0.076 |  |  |  |
| R7 | 6.169 | d7 = | 0.333 | nd4 | 1.5444 v4 | 55.82 |
| R8 | 5.411 | d8 = | 0.468 |  |  |  |
| R9 | −13.995 | d9 = | 0.465 | nd5 | 1.5444 v5 | 55.82 |
| R10 | −1.774 | d10 = | 0.045 |  |  |  |
| R11 | −23.288 | d11 = | 0.313 | nd6 | 1.6610 v6 | 20.53 |
| R12 | 12.810 | d12 = | 0.487 |  |  |  |
| R13 | −3.636 | d13 = | 0.296 | nd7 | 1.5444 v7 | 55.82 |
| R14 | 4.461 | d14 = | 0.625 |  |  |  |
| R15 | ∞ | d15 = | 0.210 | ndg | 1.5168 vg | 64.17 |
| R16 | ∞ | d16 = | 0.140 |  |  |  |

In the table, meanings of various symbols will be described as follows.

S1: aperture;

R: curvature radius of an optical surface, a central curvature radius for a lens;

R1: curvature radius of the object side surface of the first lens L1;
R2: curvature radius of the image side surface of the first lens L1;
R3: curvature radius of the object side surface of the second lens L2;
R4: curvature radius of the image side surface of the second lens L2;
R5: curvature radius of the object side surface of the third lens L3;
R6: curvature radius of the image side surface of the third lens L3;
R7: curvature radius of the object side surface of the fourth lens L4;
R8: curvature radius of the image side surface of the fourth lens L4;
R9: curvature radius of the object side surface of the fifth lens L5;
R10: curvature radius of the image side surface of the fifth lens L5;
R11: curvature radius of the object side surface of the sixth lens L6;
R12: curvature radius of the image side surface of the sixth lens L6;
R13: curvature radius of the object side surface of the seventh lens L7;
R14: curvature radius of the image side surface of the seventh lens L7;
R15: curvature radius of an object side surface of the optical filter GF;
R16: curvature radius of an image side surface of the optical filter GF;
d: on-axis thickness of a lens and an on-axis distance between lenses;
d0: on-axis distance from the aperture S1 to the object side surface of the first lens L1;
d1: on-axis thickness of the first lens L1;
d2: on-axis distance from the image side surface of the first lens L1 to the object side surface of the second lens L2;
d3: on-axis thickness of the second lens L2;
d4: on-axis distance from the image side surface of the second lens L2 to the object side surface of the third lens L3;
d5: on-axis thickness of the third lens L3;
d6: on-axis distance from the image side surface of the third lens L3 to the object side surface of the fourth lens L4;
d7: on-axis thickness of the fourth lens L4;
d8: on-axis distance from the image side surface of the fourth lens L4 to the object side surface of the fifth lens L5;
d9: on-axis thickness of the fifth lens L5;
d10: on-axis distance from the image side surface of the fifth lens L5 to the object side surface of the sixth lens L6;
d11: on-axis thickness of the sixth lens L6;
d12: on-axis distance from the image side surface of the sixth lens L6 to the object side surface of the seventh lens L7;
d13: on-axis thickness of the seventh lens L7;
d14: on-axis distance from the image side surface of the seventh lens L7 to the object side surface of the optical filter GF;
d15: on-axis thickness of the optical filter GF;
d16: on-axis distance from the image side surface of the optical filter GF to the image plane;
nd: refractive index of d line;
nd1: refractive index of d line of the first lens L1;
nd2: refractive index of d line of the second lens L2;
nd3: refractive index of d line of the third lens L3;
nd4: refractive index of d line of the fourth lens L4;
nd5: refractive index of d line of the fifth lens L5;
nd6: refractive index of d line of the sixth lens L6;
nd7: refractive index of d line of the seventh lens L7;
ndg: refractive index of d line of the optical filter GF;
vd: abbe number;
v1: abbe number of the first lens L1;
v2: abbe number of the second lens L2;
v3: abbe number of the third lens L3;
v4: abbe number of the fourth lens L4;
v5: abbe number of the fifth lens L5;
v6: abbe number of the sixth lens L6;
v7: abbe number of the seventh lens L7;
vg: abbe number of the optical filter GF.

Table 2 shows aspheric surface data of respective lens in the camera optical lens 10 according to Embodiment 1 of the present disclosure.

TABLE 2

| | Conic coefficient | Aspherical surface coefficients | | | |
|---|---|---|---|---|---|
| | k | A4 | A6 | A8 | A10 |
| R1 | −4.8349E−01 | −1.0740E−03 | 1.3185E−02 | −1.6884E−02 | 1.1653E−02 |
| R2 | −5.1855E+00 | 1.2620E−01 | −3.6881E−01 | 4.3075E−01 | −2.8472E−01 |
| R3 | 3.7046E+01 | 1.6401E−01 | −4.1108E−01 | 5.1146E−01 | −3.7999E−01 |
| R4 | 1.1691E+01 | 8.4524E−02 | −1.8794E−01 | 3.4580E−01 | −4.4857E−01 |
| R5 | 1.7926E+02 | 1.2591E−01 | −3.6931E−01 | 6.1843E−01 | −6.6714E−01 |
| R6 | 1.0664E+02 | 2.3960E−01 | −8.1613E−01 | 1.5771E+00 | −1.9075E+00 |
| R7 | 0.0000E+00 | 1.1382E−01 | −6.0162E−01 | 1.0251E+00 | −9.6662E−01 |
| R8 | 0.0000E+00 | −2.4482E−02 | −8.4377E−02 | 7.4285E−02 | −1.0470E−02 |
| R9 | −6.7905E+02 | −6.1862E−02 | 2.1789E−01 | −2.8306E−01 | 1.9366E−01 |
| R10 | −8.5294E+00 | 4.4937E−02 | 2.8091E−02 | −1.2438E−01 | 1.2797E−01 |
| R11 | −2.3737E+03 | 2.4070E−01 | −3.1441E−01 | 1.7152E−01 | −5.2787E−02 |
| R12 | −9.2371E+02 | 1.6834E−01 | −2.1225E−01 | 1.1275E−01 | −3.8237E−02 |
| R13 | 1.2857E−01 | −4.7255E−03 | −7.1033E−02 | 5.0947E−02 | −1.5839E−02 |
| R14 | −7.3541E+00 | −8.4277E−02 | 1.2422E−02 | 2.2961E−03 | −9.3880E−04 |

| | Aspherical surface coefficients | | | | |
|---|---|---|---|---|---|
| | A12 | A14 | A16 | A18 | A20 |
| R1 | −4.5904E−03 | 7.7578E−04 | −4.3541E−05 | 0.0000E+00 | 0.0000E+00 |
| R2 | 1.0963E−01 | −2.2988E−02 | 2.0287E−03 | 0.0000E+00 | 0.0000E+00 |
| R3 | 1.8182E−01 | −5.1476E−02 | 6.6397E−03 | 0.0000E+00 | 0.0000E+00 |
| R4 | 3.7940E−01 | −1.7749E−01 | 3.5082E−02 | 0.0000E+00 | 0.0000E+00 |

TABLE 2-continued

| | | | | | |
|---|---|---|---|---|---|
| R5 | 3.9683E-01 | -1.1876E-01 | 1.4189E-02 | 0.0000E+00 | 0.0000E+00 |
| R6 | 1.4128E+00 | -6.3839E-01 | 1.6628E-01 | -1.9357E-02 | 0.0000E+00 |
| R7 | 5.0076E-01 | -1.3173E-01 | 1.3722E-02 | 0.0000E+00 | 0.0000E+00 |
| R8 | -2.9114E-02 | 2.1203E-02 | -5.6135E-03 | 5.2209E-04 | 0.0000E+00 |
| R9 | -7.7314E-02 | 1.6351E-02 | -1.4021E-03 | 0.0000E+00 | 0.0000E+00 |
| R10 | -7.0388E-02 | 2.1671E-02 | -3.4839E-03 | 2.2720E-04 | 0.0000E+00 |
| R11 | 5.2522E-03 | 1.4204E-03 | -4.0769E-04 | 2.8923E-05 | 0.0000E+00 |
| R12 | 8.1213E-03 | -1.0177E-03 | 6.9217E-05 | -2.0213E-06 | 0.0000E+00 |
| R13 | 2.7512E-03 | -2.7861E-04 | 1.5464E-05 | -3.6474E-07 | 0.0000E+00 |
| R14 | 7.9039E-05 | 5.1689E-06 | -1.1658E-06 | 5.1389E-08 | 0.0000E+00 |

In Table 2, k is a conic coefficient, and A4, A6, A8, A10, A12, A14, A16, A18 and A20 are aspheric surface coefficients.

IH: Image Height $$y=(x^2/R)/[1+\{1-(k+1)(x^2/R^2)\}^{1/2}]+A4x^4+A6x^6+A8x^8+A10x^{10}+A12x^{12}+A14x^{14}+A16x^{16}+A18x^{18}+A20x^{20} \quad (7)$$

In the present embodiment, an aspheric surface of each lens surface uses the aspheric surfaces shown in the above condition (7). However, the present disclosure is not limited to the aspherical polynomials form shown in the condition (7).

Table 3 and Table 4 show design data of inflexion points and arrest points of respective lens in the camera optical lens 10 according to Embodiment 1 of the present disclosure. P1R1 and P1R2 represent the object side surface and the image side surface of the first lens L1, respectively, P2R1 and P2R2 represent the object side surface and the image side surface of the second lens L2, respectively, P3R1 and P3R2 represent the object side surface and the image side surface of the third lens L3, respectively, P4R1 and P4R2 represent the object side surface and the image side surface of the fourth lens L4, respectively, P5R1 and P5R2 represent the object side surface and the image side surface of the fifth lens L5, respectively, P6R1 and P6R2 represent the object side surface and the image side surface of the sixth lens L6, respectively, and P7R1 and P7R2 represent the object side surface and the image side surface of the seventh lens L7, respectively. The data in the column named "inflexion point position" refers to vertical distances from inflexion points arranged on each lens surface to the optic axis of the camera optical lens 10. The data in the column named "arrest point position" refers to vertical distances from arrest points arranged on each lens surface to the optic axis of the camera optical lens 10.

TABLE 3

| | Number of inflexion points | Inflexion point position 1 | Inflexion point position 2 | Inflexion point position 3 | Inflexion point position 4 |
|---|---|---|---|---|---|
| P1R1 | 1 | 1.395 | | | |
| P1R2 | 1 | 0.585 | | | |
| P2R1 | | | | | |
| P2R2 | | | | | |
| P3R1 | 2 | 0.245 | 0.425 | | |
| P3R2 | 4 | 0.175 | 0.465 | 1.195 | 1.355 |
| P4R1 | 3 | 0.495 | 1.225 | 1.445 | |
| P4R2 | 3 | 0.525 | 1.405 | 1.595 | |
| P5R1 | 2 | 0.495 | 0.875 | | |
| P5R2 | 1 | 1.925 | | | |
| P6R1 | 3 | 0.125 | 0.715 | 1.765 | |
| P6R2 | 3 | 0.735 | 2.005 | 2.335 | |
| P7R1 | 1 | 1.485 | | | |
| P7R2 | 2 | 0.475 | 2.795 | | |

TABLE 4

| | Number of arrest points | Arrest point position 1 | Arrest point position 2 |
|---|---|---|---|
| P1R1 | | | |
| P1R2 | 1 | 1.065 | |
| P2R1 | | | |
| P2R2 | | | |
| P3R1 | | | |
| P3R2 | 2 | 0.385 | 0.525 |
| P4R1 | 1 | 0.875 | |
| P4R2 | 1 | 0.875 | |
| P5R1 | | | |
| P5R2 | | | |
| P6R1 | 2 | 0.215 | 0.975 |
| P6R2 | 1 | 1.055 | |
| P7R1 | 1 | 2.765 | |
| P7R2 | 1 | 0.855 | |

Figure 2:
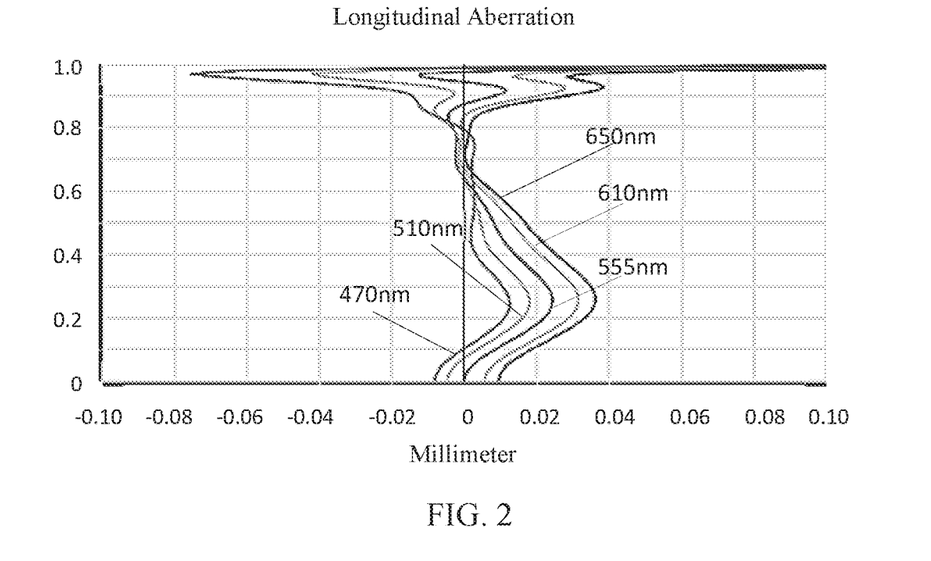
FIG. 2 is a schematic diagram of a longitudinal aberration of the camera optical lens shown in FIG. 1.
Figure 3:
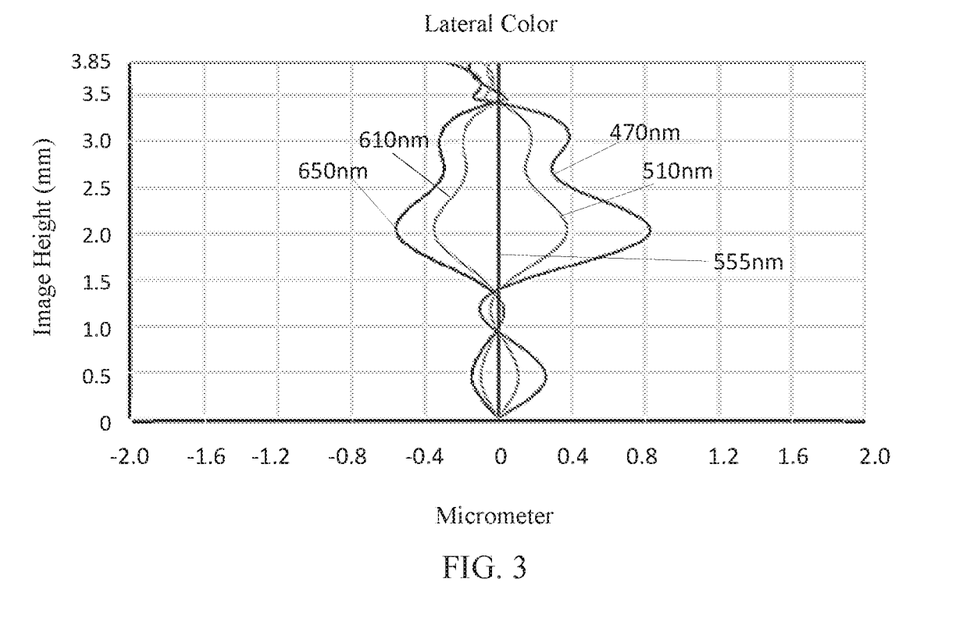
FIG. 3 is a schematic diagram of a lateral color of the camera optical lens shown in FIG. 1.
Figure 4:
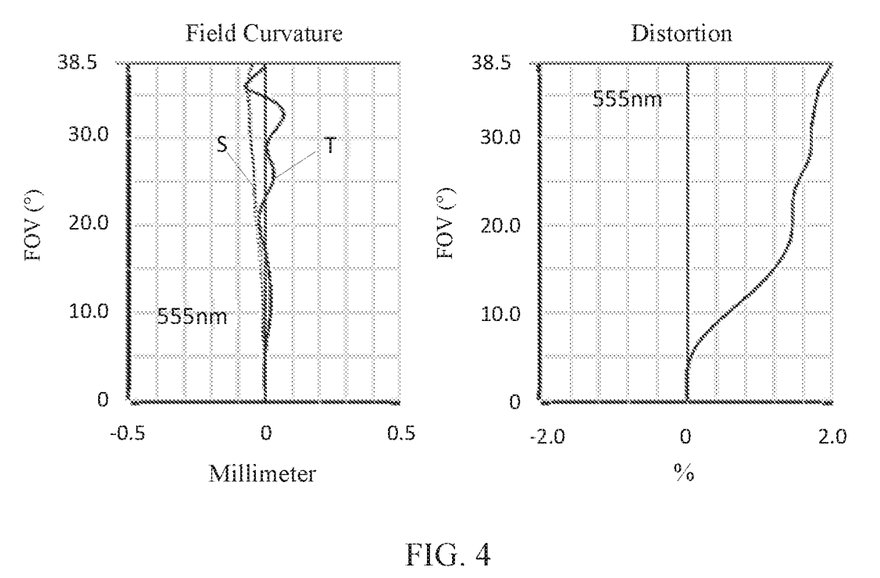
FIG. 4 is a schematic diagram of a field curvature and a distortion of the camera optical lens shown in FIG. 1.
Figure 5:
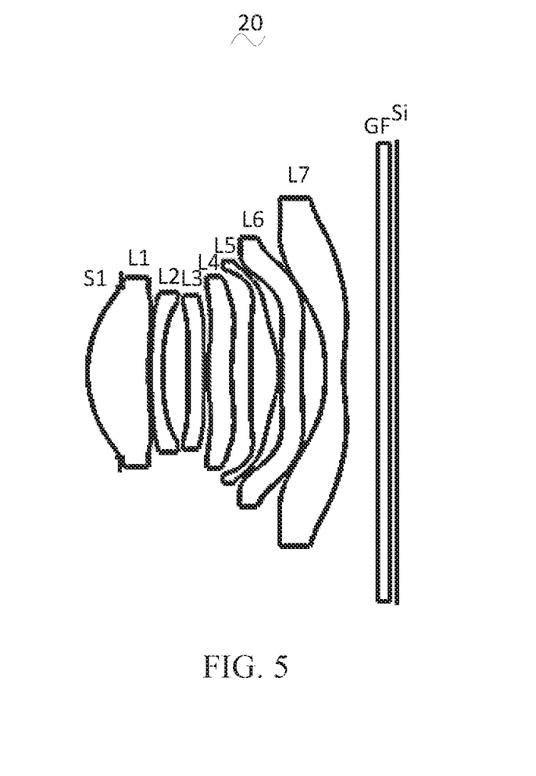
FIG. 5 is a schematic diagram of a structure of a camera optical lens in accordance with Embodiment 2 of the present disclosure.

FIG. 2 and FIG. 3 illustrate a longitudinal aberration and a lateral color of light with wavelengths of 470 nm, 510 nm, 555 nm, 610 nm and 650 nm after passing the camera optical lens 10 according to Embodiment 1. FIG. 4 illustrates a field curvature and a distortion of light with a wavelength of 555 nm after passing the camera optical lens 10 according to Embodiment 1, in which a field curvature S is a field curvature in a sagittal direction and T is a field curvature in a tangential direction.

Table 17 below further lists various values of Embodiments 1, 2, 3 and 4 and values corresponding to parameters which are specified in the above conditions.

As shown in Table 17, Embodiment 1 satisfies respective conditions.

In this embodiment, the entrance pupil diameter of the camera optical lens is 3.299 mm. The image height of 1.0H is 3.852 mm. The FOV (field of view) is 76.98°. Thus, the camera optical lens can achieve a high optical performance while satisfying design requirements for ultra-thin lenses having a big aperture.

Embodiment 2

Embodiment 2 is basically the same as Embodiment 1 and involves symbols having the same meanings as Embodiment 1, and only differences therebetween will be described in the following.

Table 5 and Table 6 show design data of a camera optical lens 20 in Embodiment 2 of the present disclosure.

TABLE 5

|  | R | d |  | nd |  | vd |
|---|---|---|---|---|---|---|
| S1 | ∞ | d0 = | −0.582 |  |  |  |
| R1 | 2.109 | d1 = | 1.099 | nd1 | 1.5806 v1 | 60.08 |
| R2 | 10.422 | d2 = | 0.038 |  |  |  |
| R3 | 23.609 | d3 = | 0.220 | nd2 | 1.6610 v2 | 20.53 |
| R4 | 6.419 | d4 = | 0.455 |  |  |  |
| R5 | −18.251 | d5 = | 0.292 | nd3 | 1.6610 v3 | 20.53 |
| R6 | −15.177 | d6 = | 0.068 |  |  |  |
| R7 | 5.455 | d7 = | 0.419 | nd4 | 1.5444 v4 | 55.82 |
| R8 | 4.934 | d8 = | 0.357 |  |  |  |
| R9 | −13.960 | d9 = | 0.503 | nd5 | 1.5444 v5 | 55.82 |
| R10 | −1.308 | d10 = | 0.044 |  |  |  |
| R11 | −10.410 | d11 = | 0.357 | nd6 | 1.6610 v6 | 20.53 |
| R12 | 8.523 | d12 = | 0.427 |  |  |  |
| R13 | −3.814 | d13 = | 0.327 | nd7 | 1.5444 v7 | 55.82 |
| R14 | 3.637 | d14 = | 0.625 |  |  |  |
| R15 | ∞ | d15 = | 0.210 | ndg | 1.5168 vg | 64.17 |
| R16 | ∞ | d16 = | 0.129 |  |  |  |

Table 6 shows aspheric surface data of respective lenses in the camera optical lens 20 according to Embodiment 2 of the present disclosure.

TABLE 6

|  | Conic coefficient | Aspherical surface coefficients | | | |
|---|---|---|---|---|---|
|  | k | A4 | A6 | A8 | A10 |
| R1 | −3.9959E−01 | 3.0848E−03 | 1.0432E−02 | −1.7580E−02 | 1.2276E−02 |
| R2 | −8.2006E+01 | 1.2984E−01 | −3.6397E−01 | 4.3000E−01 | −2.8538E−01 |
| R3 | −3.5955E+01 | 1.7242E−01 | −4.0782E−01 | 5.1063E−01 | −3.8127E−01 |
| R4 | 5.1236E+00 | 9.9137E−02 | −1.8130E−01 | 3.4465E−01 | −4.5968E−01 |
| R5 | 1.6990E+02 | 1.1851E−01 | −3.7122E−01 | 6.2389E−01 | −6.6672E−01 |
| R6 | 6.6229E+01 | 2.5166E−01 | −8.6090E−01 | 1.5327E+00 | −1.6248E+00 |
| R7 | 0.0000E+00 | 9.7026E−02 | −5.9800E−01 | 1.0297E+00 | −9.6540E−01 |
| R8 | 0.0000E+00 | −6.7254E−02 | 9.2537E−02 | −2.7277E−01 | 3.6424E−01 |
| R9 | −1.0001E+03 | −3.7941E−02 | 2.2056E−01 | −2.8339E−01 | 1.9340E−01 |
| R10 | −9.1464E+00 | −1.3325E−01 | 4.0348E−01 | −5.2669E−01 | 4.1110E−01 |
| R11 | −1.1126E+03 | 5.8609E−02 | 2.9880E−03 | −8.8264E−02 | 7.1807E−02 |
| R12 | −1.1655E+02 | −4.1526E−02 | 7.5574E−02 | −7.9701E−02 | 3.6946E−02 |
| R13 | 1.3165E−02 | −8.4922E−02 | 2.4042E−02 | 5.3707E−03 | −4.4435E−03 |
| R14 | −4.2969E+00 | −1.1274E−01 | 4.3025E−02 | −1.1566E−02 | 2.4098E−03 |

|  | Aspherical surface coefficients | | | | |
|---|---|---|---|---|---|
|  | A12 | A14 | A16 | A18 | A20 |
| R1 | −4.3987E−03 | 7.5584E−04 | −7.4020E−05 | 0.0000E+00 | 0.0000E+00 |
| R2 | 1.0927E−01 | −2.3083E−02 | 2.1131E−03 | 0.0000E+00 | 0.0000E+00 |
| R3 | 1.8139E−01 | −5.1266E−02 | 6.4433E−03 | 0.0000E+00 | 0.0000E+00 |
| R4 | 3.8552E−01 | −1.7108E−01 | 3.0560E−02 | 0.0000E+00 | 0.0000E+00 |
| R5 | 3.9663E−01 | −1.1848E−01 | 1.4082E−02 | 0.0000E+00 | 0.0000E+00 |
| R6 | 9.8458E−01 | −3.1996E−01 | 4.7705E−02 | −1.8687E−03 | 0.0000E+00 |
| R7 | 5.0055E−01 | −1.3204E−01 | 1.3646E−02 | 0.0000E+00 | 0.0000E+00 |
| R8 | −2.7076E−01 | 1.1359E−01 | −2.4767E−02 | 2.1661E−03 | 0.0000E+00 |
| R9 | −7.7363E−02 | 1.6352E−02 | −1.4036E−03 | 0.0000E+00 | 0.0000E+00 |
| R10 | −1.9818E−01 | 5.6399E−02 | −8.6387E−03 | 5.4856E−04 | 0.0000E+00 |
| R11 | −3.1792E−02 | 8.1915E−03 | −1.1030E−03 | 5.9338E−05 | 0.0000E+00 |
| R12 | −9.4192E−03 | 1.3526E−03 | −9.9242E−05 | 2.7470E−06 | 0.0000E+00 |
| R13 | 1.1820E−03 | −1.6515E−04 | 1.2073E−05 | −3.6432E−07 | 0.0000E+00 |
| R14 | −3.7269E−04 | 3.7281E−05 | −2.0514E−06 | 4.6368E−08 | 0.0000E+00 |

Table 7 and Table 8 show design data of inflexion points and arrest points of respective lens in the camera optical lens 20 according to Embodiment 2 of the present disclosure.

TABLE 7

| | Number of inflexion points | Inflexion point position 1 | Inflexion point position 2 | Inflexion point position 3 |
|---|---|---|---|---|
| P1R1 | 1 | 1.395 | | |
| P1R2 | 1 | 0.585 | | |
| P2R1 | | | | |
| P2R2 | | | | |
| P3R1 | 3 | 0.295 | 0.345 | 1.185 |
| P3R2 | 3 | 0.175 | 0.435 | 1.185 |
| P4R1 | 3 | 0.485 | 1.185 | 1.345 |
| P4R2 | 3 | 0.545 | 1.385 | 1.505 |
| P5R1 | 2 | 0.385 | 1.065 | |
| P5R2 | 3 | 0.655 | 1.135 | 1.875 |
| P6R1 | 3 | 0.255 | 0.745 | 1.725 |
| P6R2 | 3 | 0.665 | 2.015 | 2.355 |
| P7R1 | 2 | 1.465 | 2.655 | |
| P7R2 | 3 | 0.485 | 2.595 | 3.015 |

TABLE 8

| | Number of arrest points | Arrest point position 1 | Arrest point position 2 |
|---|---|---|---|
| P1R1 | 1 | 1.675 | |
| P1R2 | 1 | 1.075 | |
| P2R1 | | | |
| P2R2 | | | |
| P3R1 | | | |
| P3R2 | 2 | 0.365 | 0.485 |
| P4R1 | 1 | 0.875 | |
| P4R2 | 1 | 0.885 | |
| P5R1 | 2 | 0.615 | 1.285 |
| P5R2 | | | |
| P6R1 | 2 | 0.495 | 0.895 |
| P6R2 | 1 | 0.985 | |
| P7R1 | 2 | 2.505 | 2.745 |
| P7R2 | 1 | 0.945 | |

Figure 6:
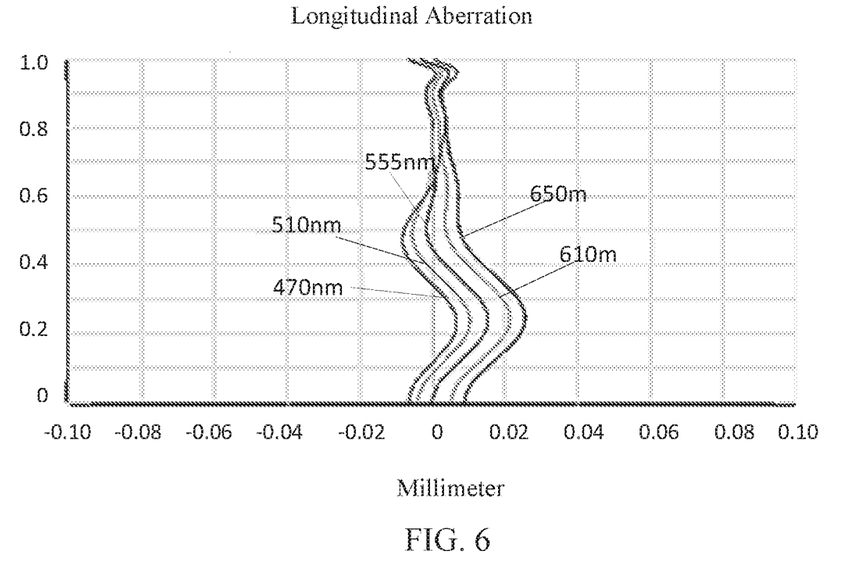
FIG. 6 is a schematic diagram of a longitudinal aberration of the camera optical lens shown in FIG. 5.
Figure 7:
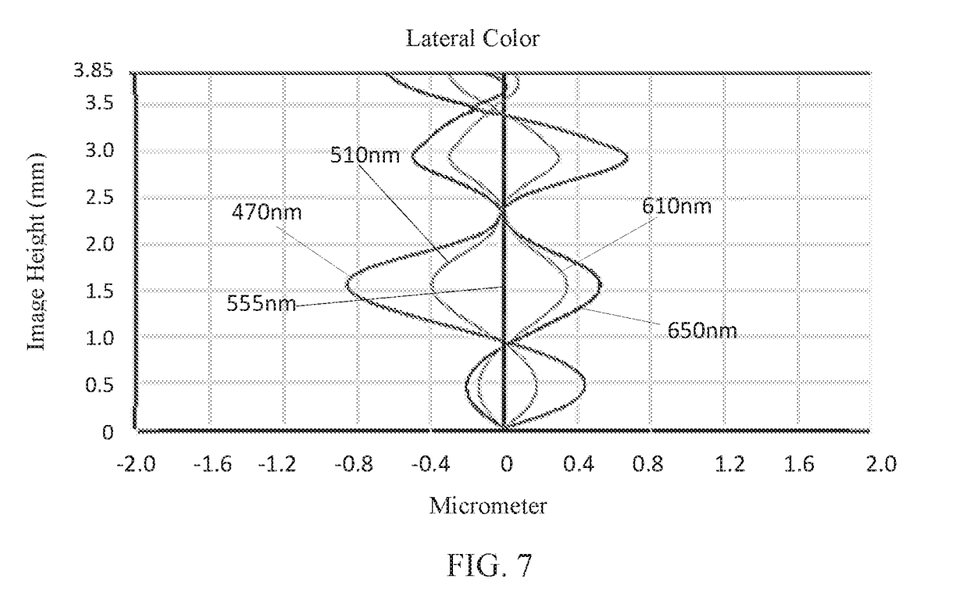
FIG. 7 is a schematic diagram of a lateral color of the camera optical lens shown in FIG. 5.
Figure 8:
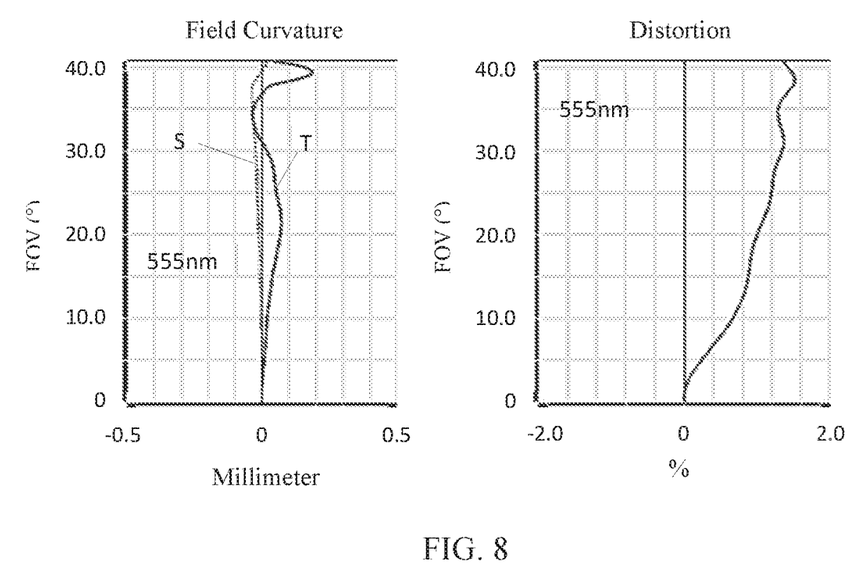
FIG. 8 is a schematic diagram of a field curvature and a distortion of the camera optical lens shown in FIG. 5.
Figure 9:
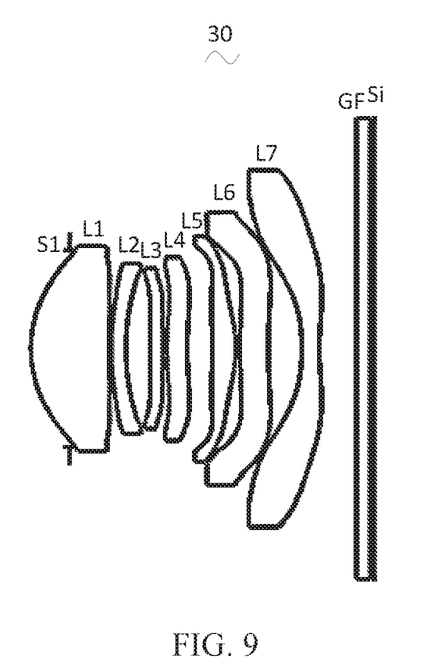
FIG. 9 is a schematic diagram of a structure of a camera optical lens in accordance with Embodiment 3 of the present disclosure.

FIG. 6 and FIG. 7 illustrate a longitudinal aberration and a lateral color of light with wavelengths of 470 nm, 510 nm, 555 nm, 610 nm and 650 nm after passing the camera optical lens 20 according to Embodiment 2. FIG. 8 illustrates a field curvature and a distortion of light with a wavelength of 555 nm after passing the camera optical lens 20 according to Embodiment 2.

As shown in Table 17, Embodiment 2 satisfies respective conditions.

In this embodiment, the entrance pupil diameter of the camera optical lens is 3.057 mm. The image height of 1.0H is 3.852 mm. The FOV (field of view) is 81.61°. Thus, the camera optical lens can achieve a high optical performance while satisfying design requirements for ultra-thin lenses having a big aperture.

Embodiment 3

Embodiment 3 is basically the same as Embodiment 1 and involves symbols having the same meanings as Embodiment 1, and only differences therebetween will be described in the following.

Table 9 and Table 10 show design data of a camera optical lens 30 in Embodiment 3 of the present disclosure.

TABLE 9

| | R | d | | nd | | vd |
|---|---|---|---|---|---|---|
| S1 | ∞ | d0 = | −0.644 | | | |
| R1 | 1.937 | d1 = | 1.278 | nd1 | 1.4342 | v1 94.95 |
| R2 | 22.857 | d2 = | 0.048 | | | |
| R3 | 6.856 | d3 = | 0.226 | nd2 | 1.6700 | v2 19.39 |
| R4 | 4.656 | d4 = | 0.372 | | | |
| R5 | −18.158 | d5 = | 0.214 | nd3 | 1.6610 | v3 20.53 |
| R6 | −10.901 | d6 = | 0.069 | | | |
| R7 | 5.740 | d7 = | 0.333 | nd4 | 1.5444 | v4 55.82 |
| R8 | 5.147 | d8 = | 0.377 | | | |
| R9 | −6.843 | d9 = | 0.409 | nd5 | 1.5444 | v5 55.82 |
| R10 | −2.119 | d10 = | 0.067 | | | |
| R11 | 6.259 | d11 = | 0.435 | nd6 | 1.6610 | v6 20.53 |
| R12 | 5.501 | d12 = | 0.589 | | | |
| R13 | −3.562 | d13 = | 0.294 | nd7 | 1.5444 | v7 55.82 |
| R14 | 4.091 | d14 = | 0.525 | | | |
| R15 | ∞ | d15 = | 0.210 | ndg | 1.5168 | vg 64.17 |
| R16 | ∞ | d16 = | 0.103 | | | |

Table 10 shows aspheric surface data of respective lenses in the camera optical lens 30 according to Embodiment 3 of the present disclosure.

TABLE 10

| | Conic coefficient | Aspherical surface coefficients | | | |
|---|---|---|---|---|---|
| | k | A4 | A6 | A8 | A10 |
| R1 | −4.4021E−01 | 1.4142E−03 | 1.0279E−02 | −1.9388E−02 | 1.3777E−02 |
| R2 | 2.2371E+02 | 1.3773E−01 | −3.7850E−01 | 4.3080E−01 | −2.8223E−01 |
| R3 | 1.8842E+01 | 1.4868E−01 | −4.1047E−01 | 5.0525E−01 | −3.8274E−01 |
| R4 | 9.2379E+00 | 7.6352E−02 | −2.0747E−01 | 3.3771E−01 | −4.4311E−01 |
| R5 | −2.3160E+02 | 1.4575E−01 | −3.7963E−01 | 6.1044E−01 | −6.6998E−01 |
| R6 | −2.5341E+01 | 3.0053E−01 | −1.0327E+00 | 2.0834E+00 | −2.6557E+00 |
| R7 | 0.0000E+00 | 1.1443E−01 | −6.0318E−01 | 1.0248E+00 | −9.6573E−01 |
| R8 | 0.0000E+00 | −4.8990E−02 | 3.5394E−02 | −1.6122E−01 | 2.4358E−01 |
| R9 | −3.3281E+02 | −3.2767E−02 | 2.1687E−01 | −2.8412E−01 | 1.9332E−01 |
| R10 | −1.2568E+01 | −1.6023E−01 | 4.3628E−01 | −5.2143E−01 | 3.8058E−01 |
| R11 | −3.6238E+02 | −5.4745E−03 | 5.2551E−02 | −1.0793E−01 | 8.6262E−02 |
| R12 | −8.4686E+01 | −1.1929E−02 | 6.1263E−03 | −4.8317E−03 | −2.4977E−03 |
| R13 | −1.7407E−01 | −1.1079E−01 | 5.9562E−02 | −2.3574E−02 | 9.2428E−03 |
| R14 | −7.2236E+00 | −1.1958E−01 | 5.7196E−02 | −2.1480E−02 | 5.6439E−03 |

| | Aspherical surface coefficients | | | | |
|---|---|---|---|---|---|
| | A12 | A14 | A16 | A18 | A20 |
| R1 | −4.2213E−03 | 3.3743E−04 | 2.7034E−05 | 0.0000E+00 | 0.0000E+00 |
| R2 | 1.0925E−01 | −2.3423E−02 | 2.1410E−03 | 0.0000E+00 | 0.0000E+00 |
| R3 | 1.8411E−01 | −5.0924E−02 | 6.1229E−03 | 0.0000E+00 | 0.0000E+00 |
| R4 | 3.7956E−01 | −1.7743E−01 | 3.4152E−02 | 0.0000E+00 | 0.0000E+00 |

TABLE 10-continued

| | | | | |
|---|---|---|---|---|
| R5 | 3.9649E−01 | −1.1807E−01 | 1.5516E−02 | 0.0000E+00 | 0.0000E+00 |
| R6 | 2.0678E+00 | −9.8053E−01 | 2.6638E−01 | −3.1829E−02 | 0.0000E+00 |
| R7 | 5.0089E−01 | −1.3182E−01 | 1.3605E−02 | 0.0000E+00 | 0.0000E+00 |
| R8 | −1.9676E−01 | 8.9223E−02 | −2.1333E−02 | 2.0974E−03 | 0.0000E+00 |
| R9 | −7.7367E−02 | 1.6357E−02 | −1.3931E−03 | 0.0000E+00 | 0.0000E+00 |
| R10 | −1.7904E−01 | 5.1454E−02 | −8.0894E−03 | 5.2910E−04 | 0.0000E+00 |
| R11 | −4.1832E−02 | 1.1622E−02 | −1.6364E−03 | 8.9738E−05 | 0.0000E+00 |
| R12 | 2.2059E−03 | −6.1667E−04 | 7.9668E−05 | −3.9696E−06 | 0.0000E+00 |
| R13 | −2.4829E−03 | 3.8690E−04 | −3.1751E−05 | 1.0649E−06 | 0.0000E+00 |
| R14 | −9.2135E−04 | 8.7018E−05 | −4.2880E−06 | 8.3062E−08 | 0.0000E+00 |

Table 11 and Table 12 show design data of inflexion points and arrest points of respective lens in the camera optical lens 30 according to Embodiment 3 of the present disclosure.

TABLE 11

| | Number of inflexion points | Inflexion point position 1 | Inflexion point position 2 | Inflexion point position 3 |
|---|---|---|---|---|
| P1R1 | 1 | 1.465 | | |
| P1R2 | 1 | 0.555 | | |
| P2R1 | | | | |
| P2R2 | | | | |
| P3R1 | 3 | 0.205 | 0.565 | 1.155 |
| P3R2 | 3 | 0.185 | 0.495 | 1.155 |
| P4R1 | 1 | 0.505 | | |
| P4R2 | 1 | 0.555 | | |
| P5R1 | 2 | 0.405 | 1.015 | |
| P5R2 | 2 | 0.665 | 1.075 | |
| P6R1 | 2 | 0.645 | 1.695 | |
| P6R2 | 2 | 0.665 | 2.035 | |
| P7R1 | 3 | 1.415 | 2.385 | 2.625 |
| P7R2 | 1 | 0.445 | | |

TABLE 12

| | Number of arrest points | Arrest point position 1 | Arrest point position 2 | Arrest point position 3 |
|---|---|---|---|---|
| P1R1 | | | | |
| P1R2 | 1 | 0.895 | | |
| P2R1 | | | | |
| P2R2 | | | | |
| P3R1 | 2 | 0.415 | 0.665 | |
| P3R2 | 3 | 0.435 | 0.545 | 1.295 |
| P4R1 | 1 | 0.895 | | |
| P4R2 | 1 | 0.895 | | |
| P5R1 | 2 | 0.705 | 1.195 | |
| P5R2 | | | | |
| P6R1 | 1 | 0.955 | | |
| P6R2 | 1 | 1.125 | | |
| P7R1 | | | | |
| P7R2 | 1 | 0.845 | | |

Figure 10:
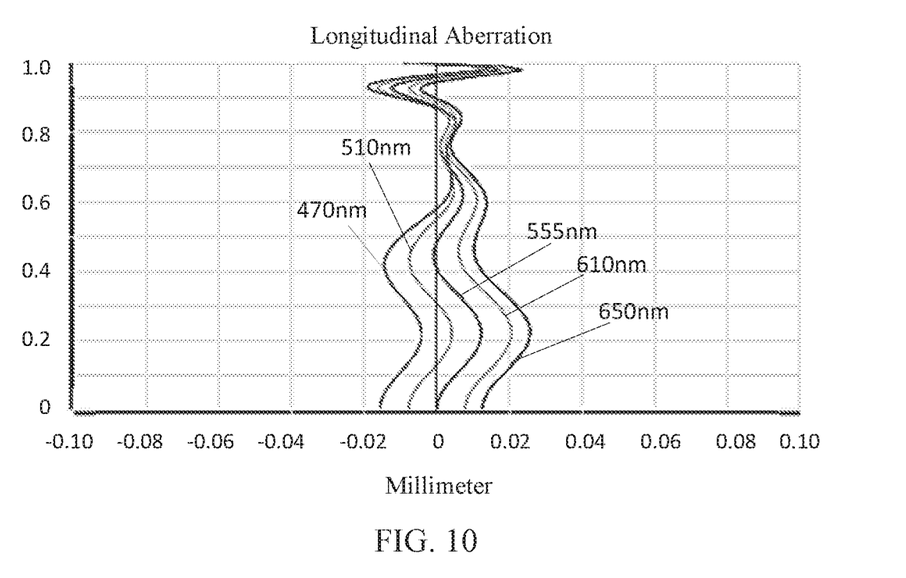
FIG. 10 is a schematic diagram of a longitudinal aberration of the camera optical lens shown in FIG. 9.
Figure 11:
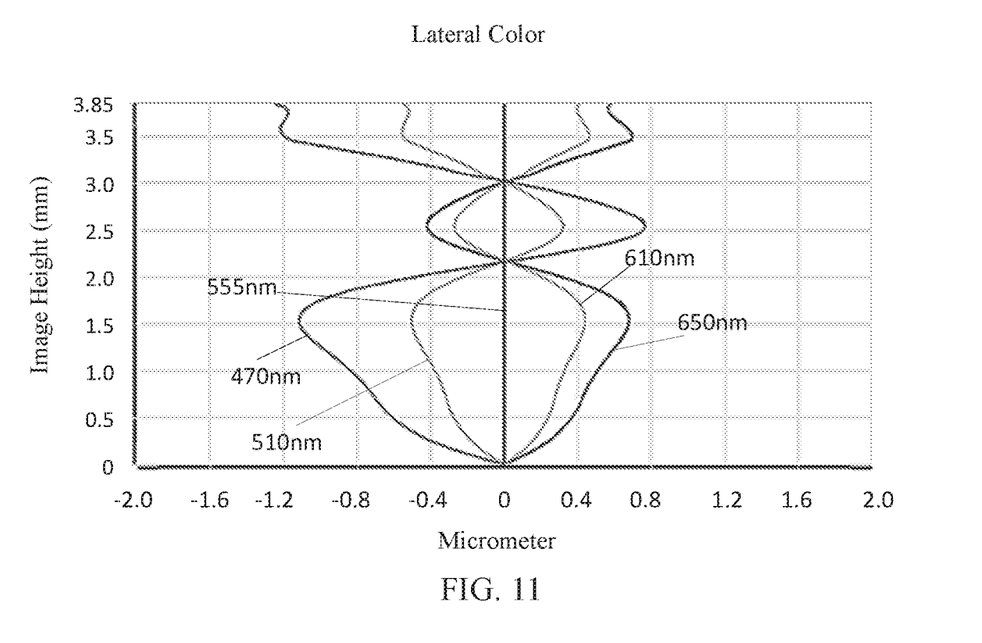
FIG. 11 is a schematic diagram of a lateral color of the camera optical lens shown in FIG. 9.
Figure 12:
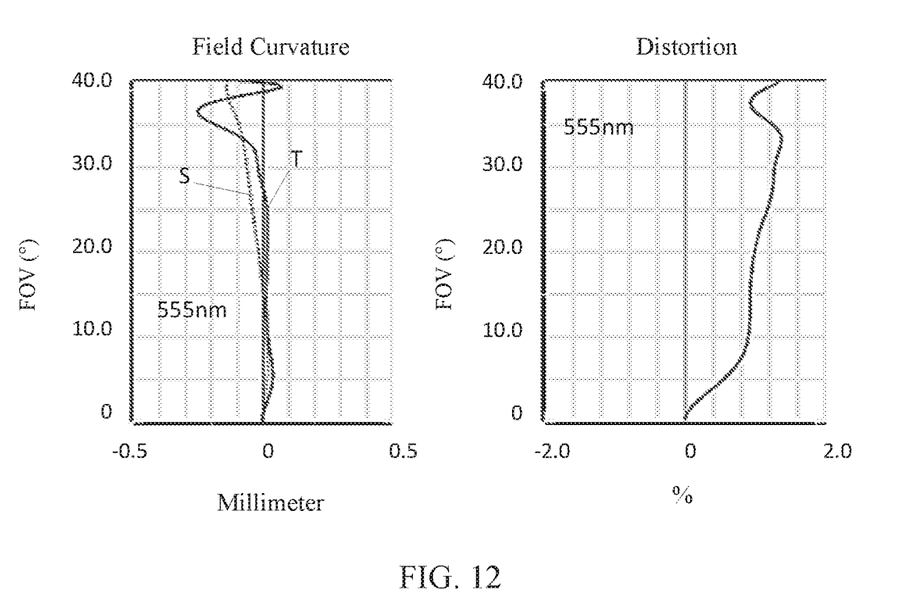
FIG. 12 is a schematic diagram of a field curvature and a distortion of the camera optical lens shown in FIG. 9.
Figure 13:
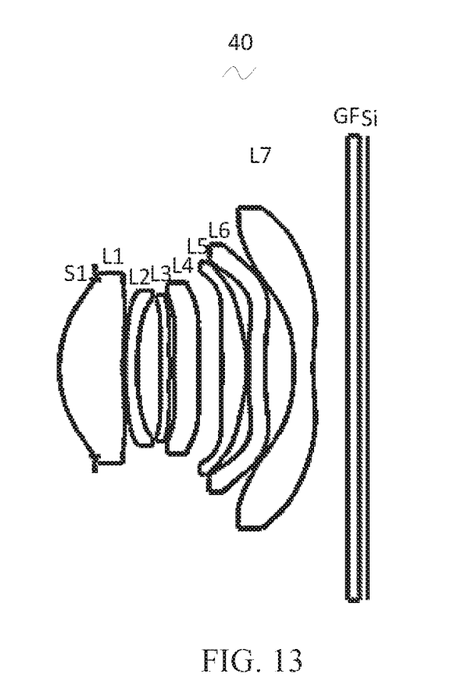
FIG. 13 is a schematic diagram of a structure of a camera optical lens in accordance with Embodiment 4 of the present disclosure.

FIG. 10 and FIG. 11 illustrate a longitudinal aberration and a lateral color of light with wavelengths of 470 nm, 510 nm, 555 nm, 610 nm and 650 nm after passing the camera optical lens 30 according to Embodiment 3. FIG. 12 illustrates field curvature and distortion of light with a wavelength of 555 nm after passing the camera optical lens 30 according to Embodiment 3.

As shown in Table 17, Embodiment 3 satisfies respective conditions.

In this embodiment, the entrance pupil diameter of the camera optical lens is 3.117 mm. The image height of 1.0H is 3.852 mm. The FOV (field of view) is 80.50°. Thus, the camera optical lens can achieve a high optical performance while satisfying design requirements for ultra-thin lenses having a big aperture.

Embodiment 4

Embodiment 4 is basically the same as Embodiment 1 and involves symbols having the same meanings as Embodiment 1, and only differences therebetween will be described in the following.

Table 13 and Table 14 show design data of a camera optical lens 40 in Embodiment 4 of the present disclosure.

TABLE 13

| | R | d | | nd | vd |
|---|---|---|---|---|---|
| S1 | ∞ | d0 = | −0.641 | | |
| R1 | 2.035 | d1 = | 1.141 | nd1 1.5378 | v1 74.70 |
| R2 | 12.096 | d2 = | 0.049 | | |
| R3 | 11.458 | d3 = | 0.203 | nd2 1.6610 | v2 20.53 |
| R4 | 5.536 | d4 = | 0.418 | | |
| R5 | −28.215 | d5 = | 0.157 | nd3 1.6610 | v3 20.53 |
| R6 | −17.391 | d6 = | 0.089 | | |
| R7 | 22.075 | d7 = | 0.438 | nd4 1.5444 | v4 55.82 |
| R8 | 14.744 | d8 = | 0.417 | | |
| R9 | −39.013 | d9 = | 0.453 | nd5 1.5444 | v5 55.82 |
| R10 | −2.113 | d10 = | 0.020 | | |
| R11 | −96.605 | d11 = | 0.303 | nd6 1.6610 | v6 20.53 |
| R12 | 26.753 | d12 = | 0.516 | | |
| R13 | −3.414 | d13 = | 0.340 | nd7 1.5444 | v7 55.82 |
| R14 | 4.056 | d14 = | 0.625 | | |
| R15 | ∞ | d15 = | 0.210 | ndg 1.5168 | vg 64.17 |
| R16 | ∞ | d16 = | 0.138 | | |

Table 14 shows aspheric surface data of respective lenses in the camera optical lens 40 according to Embodiment 4 of the present disclosure.

TABLE 14

| | Conic coefficient | Aspherical surface coefficients | | | |
|---|---|---|---|---|---|
| | k | A4 | A6 | A8 | A10 |
| R1 | −4.8818E−01 | −1.0740E−03 | 1.3185E−02 | −1.6884E−02 | 1.1653E−02 |
| R2 | 1.1242E+00 | 1.2620E−01 | −3.6881E−01 | 4.3075E−01 | −2.8472E−01 |
| R3 | 5.7249E+01 | 1.6401E−01 | −4.1108E−01 | 5.1146E−01 | −3.7999E−01 |
| R4 | 1.3039E+01 | 8.4524E−02 | −1.8794E−01 | 3.4580E−01 | −4.4857E−01 |
| R5 | −1.6613E+02 | 1.2591E−01 | −3.6931E−01 | 6.1843E−01 | −6.6714E−01 |
| R6 | 9.1686E+01 | 2.3960E−01 | −8.1613E−01 | 1.5771E+00 | −1.9075E+00 |
| R7 | 0.0000E+00 | 1.1382E−01 | −6.0162E−01 | 1.0251E+00 | −9.6662E−01 |

TABLE 14-continued

| | | | | | |
|---|---|---|---|---|---|
| R8 | 0.0000E+00 | −2.4482E−02 | −8.4377E−02 | 7.4285E−02 | −1.0470E−02 |
| R9 | 4.7757E+02 | −6.1862E−02 | 2.1789E−01 | −2.8306E−01 | 1.9366E−01 |
| R10 | −7.8083E+00 | 4.4937E−02 | 2.8091E−02 | −1.2438E−01 | 1.2797E−01 |
| R11 | −1.4159E+03 | 2.4070E−01 | −3.1441E−01 | 1.7152E−01 | −5.2787E−02 |
| R12 | −9.9474E+01 | 1.6834E−01 | −2.1225E−01 | 1.1275E−01 | −3.8237E−02 |
| R13 | −2.0681E−01 | −4.7255E−03 | −7.1033E−02 | 5.0947E−02 | −1.5839E−02 |
| R14 | −8.6290E+00 | −8.4277E−02 | 1.2422E−02 | 2.2961E−03 | −9.3880E−04 |

| | Aspherical surface coefficients | | | | |
|---|---|---|---|---|---|
| | A12 | A14 | A16 | A18 | A20 |
| R1 | −4.5904E−03 | 7.7578E−04 | −4.3541E−05 | 0.0000E+00 | 0.0000E+00 |
| R2 | 1.0963E−01 | −2.2988E−02 | 2.0287E−03 | 0.0000E+00 | 0.0000E+00 |
| R3 | 1.8182E−01 | −5.1476E−02 | 6.6397E−03 | 0.0000E+00 | 0.0000E+00 |
| R4 | 3.7940E−01 | −1.7749E−01 | 3.5082E−02 | 0.0000E+00 | 0.0000E+00 |
| R5 | 3.9683E−01 | −1.1876E−01 | 1.4189E−02 | 0.0000E+00 | 0.0000E+00 |
| R6 | 1.4128E+00 | −6.3839E−01 | 1.6628E−01 | −1.9357E−02 | 0.0000E+00 |
| R7 | 5.0076E−01 | −1.3173E−01 | 1.3722E−02 | 0.0000E+00 | 0.0000E+00 |
| R8 | −2.9114E−02 | 2.1203E−02 | −5.6135E−03 | 5.2209E−04 | 0.0000E+00 |
| R9 | −7.7314E−02 | 1.6351E−02 | −1.4021E−03 | 0.0000E+00 | 0.0000E+00 |
| R10 | −7.0388E−02 | 2.1671E−02 | −3.4839E−03 | 2.2720E−04 | 0.0000E+00 |
| R11 | 5.2522E−03 | 1.4204E−03 | −4.0769E−04 | 2.8923E−05 | 0.0000E+00 |
| R12 | 8.1213E−03 | −1.0177E−03 | 6.9217E−05 | −2.0213E−06 | 0.0000E+00 |
| R13 | 2.7512E−03 | −2.7861E−04 | 1.5464E−05 | −3.6474E−07 | 0.0000E+00 |
| R14 | 7.9039E−05 | 5.1689E−06 | −1.1658E−06 | 5.1389E−08 | 0.0000E+00 |

Table 15 and Table 16 show design data of inflexion points and arrest points of respective lens in the camera optical lens 40 according to Embodiment 4 of the present disclosure.

TABLE 15

| | Number of inflexion points | Inflexion point position 1 | Inflexion point position 2 | Inflexion point position 3 |
|---|---|---|---|---|
| P1R1 | 1 | 1.385 | | |
| P1R2 | 1 | 0.575 | | |
| P2R1 | | | | |
| P2R2 | | | | |
| P3R1 | 3 | 0.175 | 0.515 | 1.235 |
| P3R2 | 3 | 0.165 | 0.485 | 1.175 |
| P4R1 | 2 | 0.395 | 1.235 | |
| P4R2 | 2 | 0.355 | 1.415 | |
| P5R1 | 2 | 0.495 | 0.845 | |
| P5R2 | 1 | 1.925 | | |
| P6R1 | 3 | 0.065 | 0.715 | 1.765 |
| P6R2 | 2 | 0.745 | 2.005 | |
| P7R1 | 1 | 1.485 | | |
| P7R2 | 2 | 0.485 | 2.795 | |

TABLE 16

| | Number of arrest points | Arrest point position 1 | Arrest point position 2 |
|---|---|---|---|
| P1R1 | | | |
| P1R2 | 1 | 1.005 | |
| P2R1 | | | |
| P2R2 | | | |
| P3R1 | 2 | 0.335 | 0.645 |
| P3R2 | 2 | 0.325 | 0.625 |
| P4R1 | 1 | 0.585 | |
| P4R2 | 1 | 0.575 | |
| P5R1 | | | |
| P5R2 | | | |
| P6R1 | 2 | 0.105 | 0.985 |
| P6R2 | 1 | 1.065 | |
| P7R1 | 1 | 2.695 | |
| P7R2 | 1 | 0.885 | |

Figure 14:
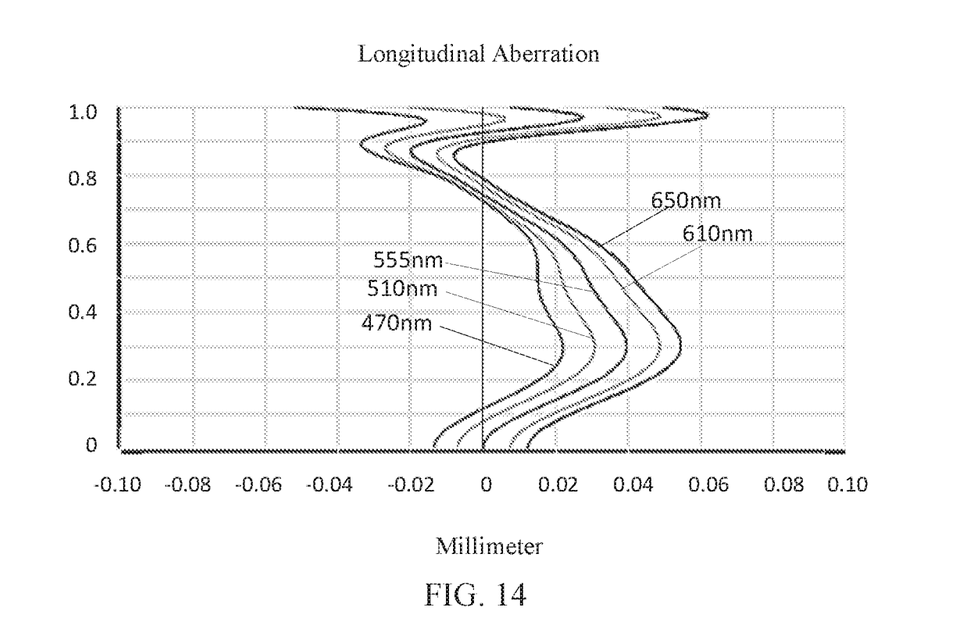
FIG. 14 is a schematic diagram of a longitudinal aberration of the camera optical lens shown in FIG. 13.
Figure 15:
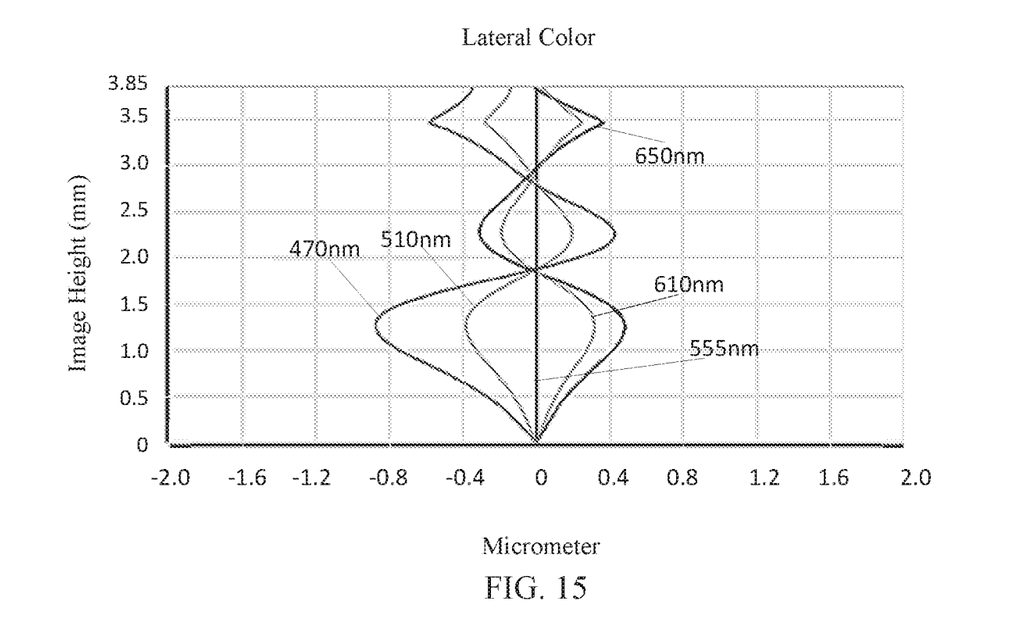
FIG. 15 is a schematic diagram of a lateral color of the camera optical lens shown in FIG. 13.
Figure 16:
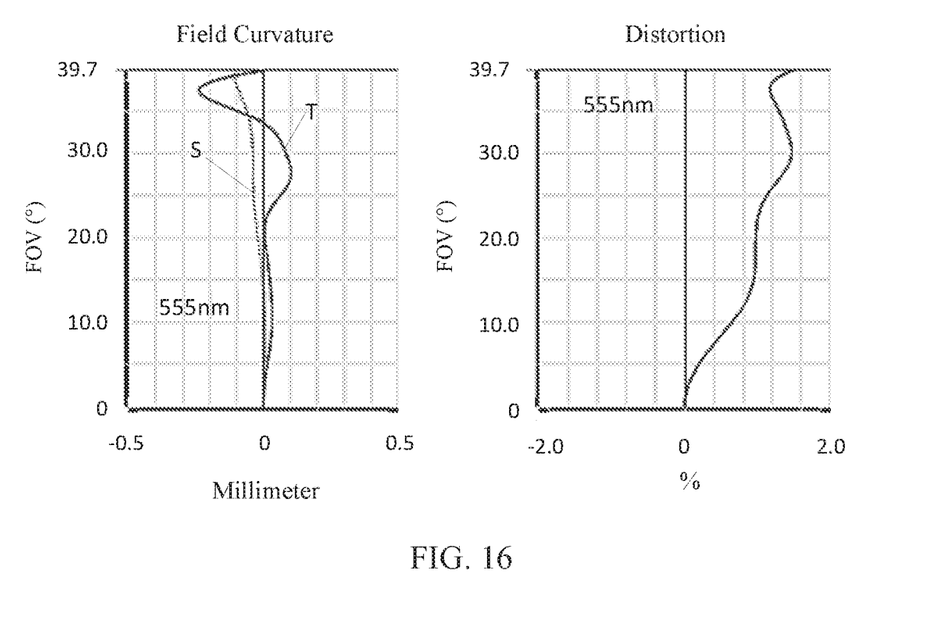
FIG. 16 is a schematic diagram of a field curvature and a distortion of the camera optical lens shown in FIG. 13.

FIG. 14 and FIG. 15 illustrate a longitudinal aberration and a lateral color of light with wavelengths of 470 nm, 510 nm, 555 nm, 610 nm and 650 nm after passing the camera optical lens 40 according to Embodiment 4. FIG. 16 illustrates a field curvature and a distortion of light with a wavelength of 555 nm after passing the camera optical lens 40 according to Embodiment 4.

As shown in Table 17, Embodiment 4 satisfies respective conditions.

In this embodiment, the entrance pupil diameter of the camera optical lens is 3.171 mm. The image height of 1.0H is 3.852 mm. The FOV (field of view) is 79.47°. Thus, the camera optical lens can achieve a high optical performance while satisfying design requirements for ultra-thin lenses having a big aperture.

TABLE 17

| Condition | Embodiment 1 | Embodiment 2 | Embodiment 3 | Embodiment 4 | Notes |
|---|---|---|---|---|---|
| f4/f2 | 6.10 | 9.93 | 5.09 | 5.10 | Condition (1) |
| f3/f5 | 33.87 | 49.96 | 7.53 | 16.60 | Condition (2) |
| f2/f | −3.29 | −3.02 | −4.99 | −3.57 | Condition (3) |
| (d3 + d5)/TTL | 0.08 | 0.09 | 0.08 | 0.07 | Condition (4) |

TABLE 17-continued

| Condition | Embodiment 1 | Embodiment 2 | Embodiment 3 | Embodiment 4 | Notes |
|---|---|---|---|---|---|
| (R5 + R6)/(R5 − R6) | 10.10 | 10.87 | 4.00 | 4.21 | Condition (5) |
| (R7 + R8)/(R7 − R8) | 15.28 | 19.94 | 18.36 | 5.02 | Condition (6) |
| f | 4.750 | 4.402 | 4.488 | 4.567 | |
| f1 | 4.351 | 4.328 | 4.776 | 4.366 | |
| f2 | −15.637 | −13.291 | −22.377 | −16.286 | |
| f3 | 124.354 | 130.199 | 40.436 | 67.595 | |
| f4 | −95.387 | −131.975 | −113.889 | −83.048 | |
| f5 | 3.671 | 2.606 | 5.372 | 4.073 | |
| f6 | −12.352 | −6.976 | −88.444 | −31.392 | |
| f7 | −3.621 | −3.357 | −3.440 | −3.341 | |
| f12 | 5.442 | 5.746 | 5.613 | 5.442 | |
| TTL | 5.589 | 5.570 | 5.549 | 5.517 | |

It can be appreciated by one having ordinary skill in the art that the description above is only embodiments of the present disclosure. In practice, one having ordinary skill in the art can make various modifications to these embodiments in forms and details without departing from the spirit and scope of the present disclosure.

What is claimed is:

1. A camera optical lens, comprising, from an object side to an image side:
an aperture;
a first lens having a positive refractive power;
a second lens having a negative refractive power;
a third lens having a positive refractive power;
a fourth lens having a negative refractive power;
a fifth lens having a positive refractive power;
a sixth lens having a negative refractive power; and
a seventh lens having a negative refractive power,
wherein the camera optical lens satisfies following conditions:

$5.00 \le f4/f2 \le 10.00$; and $7.50 \le f3/f5 \le 50.00$, where
f2 denotes a focal length of the second lens;
f3 denotes a focal length of the third lens;
f4 denotes a focal length of the fourth lens; and
f5 denotes a focal length of the fifth lens.

2. The camera optical lens as described in claim 1, further satisfying a following condition:

$-5.00 \le f2/f \le -3.00$, where
f denotes a focal length of the camera optical lens.

3. The camera optical lens as described in claim 1, further satisfying a following condition:

$0 \le (d3+d5)/TTL \le 0.10$, where
d3 denotes an on-axis thickness of the second lens;
d5 denotes an on-axis thickness of the third lens; and
TTL denotes a total optical length from an object side surface of the first lens to an image plane of the camera optical lens along an optic axis.

4. The camera optical lens as described in claim 1, further satisfying a following condition:

$4.00 \le (R5+R6)/(R5-R6) \le 11.00$, where
R5 denotes a curvature radius of an object side surface of the third lens; and
R6 denotes a curvature radius of an image side surface of the third lens.

5. The camera optical lens as described in claim 1, further satisfying a following condition:

$5.00 \le (R7+R8)/(R7-R8) \le 20.00$ where
R7 denotes a curvature radius of an object side surface of the fourth lens; and
R8 denotes a curvature radius of an image side surface of the fourth lens.

* * * * *